United States Patent Office 2,884,416
Patented Apr. 28, 1959

2,884,416
MINERAL ACID SALTS OF PREGNANE-3,11,20-TRIONE 3-ENAMINES

John C. Babcock, Portage Township, Kalamazoo County, Mich., assignor to The Upjohn Company, Kalamazoo, Mich., a corporation of Michigan No Drawing. Application March 20, 1958
Serial No. 722,643

7 Claims. (Cl. 260—239.5)

This invention relates to new steroid compounds and is particularly concerned with the mineral acid salts of pregnane-3,11,20-trione 3-enamines and Schiff bases.

It is an object of the invention to provide novel physiologically active compounds. It is a further object to provide novel central nervous system depressants useful as daytime sedatives or tranquillizing agents. It is an additional object to provide novel compounds that are safe and effective for these purposes, are water soluble, and have a prolonged pharmacodynamic effect.

These and other objects are accomplished in the novel compounds of the invention, which are represented by the following formula:

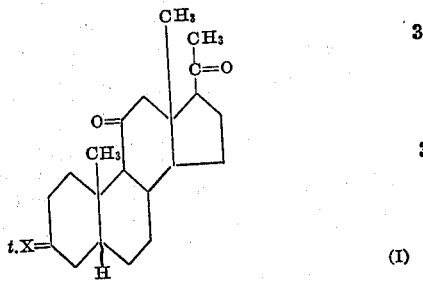

wherein X is a primary or secondary amine radical, especially piperidinyl, substituted piperidinyl, pyrrolidinyl, substituted pyrrolidinyl, and morpholinyl, the 5-hydrogen is either α (allo) or β (normal) and t is a halide such as chloride, bromide and iodide or other pharmacologically acceptable anion.

Administration of the novel water soluble steroids to the animal organism can be by injection, preferably intravenously and conveniently during infusion of another liquid by introduction above the infusion needle.

The process of the present invention comprises: treating allo or normal pregnane-3,11,20-trione with a secondary amine to convert the ketone group at the 3-position to an enamine derivative, or with a primary amine to obtain the corresponding Schiff base, and treating the resulting enamine or Schiff base with an acid to obtain a water soluble salt represented by Formula I.

During the enamine formation a double bond is introduced into the A ring of the steroid nucleus. With normal pregnanes the resulting double bond is in the 3,4-position; with allopregnanes the resulting double bond is in the 2,3-position. In the salt obtained by acid treatment of either allo or normal enamine derivatives the double bond lies between the nitrogen and the 3-carbon atom.

The enamine derivatives are preferably prepared by heating the 3-ketosteroid with a secondary amine in an organic solvent, removing the water as it is formed in the course of the reaction, and isolating the enamine thus formed. The water that is formed can be removed by azeotropic distillation or by a basic inorganic water binding agent such as potassium carbonate, calcium oxide, barium oxide, and the like. Conditions for the formation of such enamines include a reaction temperature between 25 and approximately 150 degrees centigrade, preferably between 40 and 110 degrees centigrade and conveniently at the reflux temperature of the reaction mixture but always below the decomposition temperature of the product, i.e., the enamine. The reaction time varies according to the reactivity of the amine and the temperature of the reaction. Ordinarily a reaction period of from about thirty minutes to twenty hours is satisfactory when a temperature within the preferred range is employed. Some highly reactive amines require only a few minutes for reaction. Although the preferred amount of amine employed is in the ratio of four moles of amine to one mole of steroid, ratios of one mole to twenty moles or more of amine to one mole of steroid are operative. Among the solvents which can be used are diethyl ether, tetrahydrofuran, an excess of the amine, benzene, xylene, toluene, pentane, hexane, methanol, ethanol and the like. An acid catalyst can be added as an aid to the reaction and to enhance the yield of product. For this purpose paratoluenesulfonic acid, naphthalenesulfonic acid, sulfuric acid and the like may be used.

Representative amines which can be employed in the preparation of the enamines include dialkylamines such as diethylamine, dipropylamine, dibutylamine, dihexylamine, dioctylamine and didodecylamine; cycloalkylamines such as dicyclopentylamine, dicyclohexylamine and the like; cyclic amines such as piperidine, 2-methylpiperidine (α-pipecoline), 3-methylpiperidine (β-pipecoline), 2-ethylpiperidine, 2-propylpiperidine (coniine), 3-propylpiperidine, 2,6-dimethylpiperidine, 4,4-dimethylpiperidine, 2-methyl-5-ethylpiperidine (kopellidine), 4-methyl-3-ethylpiperidine, 2,2,6-trimethylpiperidine, 2,4,6-trimethylpiperidine, pyrrolidine, 2-methylpyrrolidine, 3-methylpyrrolidine, 2,5-dimethylpyrrolidine, 2,2,5,5-tetramethylpyrrolidine, 2-ethylpyrrolidine, 2-butylpyrrolidine, morpholine and the like; aralkylalkylamines such as N-methylbenzylamine, N-ethylbenzylamine and the like, substituted dialkylamines such as diethanolamine and the like and arylalkylamines such as N-methylaniline, N-methyltoluidine, N-methylanisidine and the like.

The enamines thus obtained are usually well-defined crystalline solids which are soluble in methylene chloride, chloroform and the like and moderately soluble in methanol, acetone, diethyl ether and the like. When treated with acids they form addition salts. The A-ring double bond migrates to a position between the nitrogen atom and the 3-carbon atom. For example, treating the 3-enamine dissolved in an inert solvent with gaseous hydrogen chloride or hydrogen bromide produces the corresponding chloride or bromide. Other mineral acids can be used such as hydriodic acid, sulfuric acid, perchloric acid, and the like.

In the same manner as given above, treating allo or normal pregnane-3,11,20-trione with primary amines, for example ethylamine, propylamine, isopropylamine, hexylamine, cyclohexylamine, aniline, and the like, is productive of the corresponding Schiff base wherein the nitrogen atom is attached to the steroid nucleus at the 3-position. Treating the thus obtained Schiff bases with an acid is productive of water soluble salts represented by Formula I.

The compounds of the present invention are water soluble salts of Formula I (both allo and normal). These compounds, and particularly those having the normal configuration have the advantages over the parent triketosteroid of water solubility and both rapid and more prolonged action. For example, when two milligrams of pregnane-3,11,20-trione is administered intraperitoneally to rats, anesthesia is induced in two to five minutes and the animals sleep about thirty minutes whereas when 2.5 milligrams of 1-(11,20-diketopregnan-3-ylidene)-pyrrolidinium chloride (I, $X=(CH_2)_5N$, $t=Cl$) was given intraperitoneally induction time was quite short and the animals slept from sixty to ninety minutes. In chemical equivalents, the two milligram dose of pregnane-3,11,20-trione is larger than the 2.5 milligram dose of 1-(11,20-diketopregnan-3-ylidene)-pyrrolidinium chloride. When one milligram of 1-(11,20-diketopregnan-3-ylidene)-pyrrolidinium chloride in saline was injected subcutaneously into rats the induction period was ten to twenty minutes and the animals slept for about forty minutes. When the same dose was injected intraperitoneally the induction period was about five minutes and the animals slept about 22 minutes. When the same dose was injected intravenously the animals fell asleep in about two minutes and remained under anesthesia for about thirty minutes. Pregnane-3,11,20-trione can not be given intravenously as it is not water soluble.

The compounds of the present invention also possess respiratory depressant and anticholinergic properties.

The invention may be more fully understood by the following examples which are illustrative only and not to be construed as limiting.

*Example 1.—3-(1-pyrrolidinyl)-3-pregnene-11,20-dione*

Three grams of pregnane-3,11,20-trione was dissolved in fifteen milliliters of boiling methanol under reflux. The atmosphere was replaced with nitrogen and two milliliters of pyrrolidine was added. After one minute on the steam bath the reaction mixture was cooled, scratched and chilled, giving a slightly yellow crystalline precipitate which was collected by filtration, washed with methanol, and dried in vacuo to give 2.85 grams of 3-(1-pyrrolidinyl)-3-pregnene-11,20-dione having a melting point of 158 to 173 degrees centigrade with decomposition, an ultraviolet absorption maximum $a_M$ of 9,225 at 233 millimicrons in ether, and the following analysis:

Analysis. — Calculated for $C_{25}H_{37}NO_2$: N, 3.50. Found: N, 3.65.

*Example 2.—3-(1-pyrrolidinyl)-3-pregnene-11,20-dione*

A solution of five grams of pregnane-3,11,20-trione in fifty milliliters of benzene and 2.5 milliliters of pyrrolidine was refluxed under nitrogen with azeotropic separation of water for a period of 1.5 hours. The reaction mixture was then concentrated by evaporation to twenty milliliters (crystals separated) diluted with fifty milliliters of ether, chilled, and filtered to give 4.4 grams of almost white crystals of 3-(1-pyrrolidinyl)-3-pregnene-11,20-dione having a melting point of 163 to 181 degrees centigrade, an ultraviolet absorption maximum $a_M$ of 10,650 at 233 millimicrons in ether, a rotation $[\alpha]_D$ of plus 180 degrees (chloroform) and the following analysis:

Analysis.—Calculated for $C_{25}H_{37}NO_2$: C, 78.28; H, 9.72; N, 3.50. Found: C, 78.46; H, 9.86; N, 3.93.

*Example 3.—3-(1-pyrrolidinyl)-2-allopregnene-11,20-dione*

A solution of three grams of allopregnane-3,11,20-trione in 25 milliliters of methanol, four milliliters of methylene chloride, and two milliliters of pyrrolidine was boiled and concentrated, in an atmosphere of nitrogen, for ten minutes on the steam bath reducing the volume to about twenty milliliters. The reaction mixture was filtered while hot to remove a trace of insoluble material and cooled to give 1.3 grams of 3-(1-pyrrolidinyl)-2-allopregnene-11,20-dione as pale yellow crystals having a melting point of 139 to 158 degrees centigrade with decomposition, an ultraviolet absorption maximum $a_M$ of 3,800 at 228 millimicrons in ether and the following analysis:

Analysis. — Calculated for $C_{25}H_{37}NO_2$: N, 3.50. Found: N, 3.62.

*Example 4.—3-(1-pyrrolidinyl)-2-allopregnene-11,20-dione*

A solution of five grams of allopregnane-3,11,20-trione in fifty milliliters of benzene and 2.5 milliliters of pyrrolidine was refluxed in a nitrogen atmosphere for about 1.5 hours, then the reaction mixture was concentrated to about twenty milliliters, diluted with fifty milliliters of ether, and chilled to give a precipitate of 4.3 grams of 3-(1-pyrrolidinyl)-2-allopregnene-11,20-dione as a pale yellow solid having a melting point of 135 to 170 degrees centigrade and an ultraviolet absorption maximum $a_M$ of 2,900 at 228 millimicrons in ether.

*Example 5.—3-(1-piperidinyl)-3-pregnene-11,20-dione*

Five grams of pregnane-3,11,20-trione and 100 milligrams of paratoluenesulfonic acid monohydrate are dissolved in fifty milliliters of piperidine and the mixture is refluxed in a nitrogen atmosphere for one hour, then most of the solvent is removed by slow distillation for three hours. The reaction mixture is then concentrated by evaporation under diminished pressure giving 3-(1-piperidinyl)-3-pregnene-11,20-dione, a light colored crystalline solid.

*Example 6.—3-(4-morpholinyl)-3-pregnene-11,20-dione*

In the same manner as given in Example 2, treating pregnane-3,11,20-trione with morpholine is productive of 3-(4-morpholinyl)-3-pregnene-11,20-dione.

*Example 7.—3-(1-piperidinyl)-2-allopregnene-11,20-dione*

In the same manner as given in Example 5, treating allopregnane-3,11,20-trione with piperidine is productive of 3-(1-piperidinyl)-2-allopregnene-11,20-dione.

*Example 8.—3-(4-morpholinyl)-2-allopregnene-11,20-dione*

In the same manner as given in Example 2, treating allopregnane-3,11,20-trione with morpholine is productive of 3-(4-morpholinyl)-2-allopregnene-11,20-dione.

*Example 9.—1-(11,20-diketopregnan-3-ylidene)-pyrrolidinium chloride*

Gaseous dry hydrogen chloride was passed through a solution of 0.7 gram of 3-(1-pyrrolidinyl)-3-pregnene-11,20-dione in two milliliters of methylene chloride over a period of five minutes, with cooling, resulting in a cloudy yellow solution. The thus obtained solution was evaporated under diminished pressure to dryness to give 1-(11,20-diketopregnan-3-ylidene)-pyrrolidinium chloride as a fluffy straw colored hygroscopic glass having a positive Beilstein test. The salt was completely and readily soluble in a physiological saline.

In the same manner as given above, treating 3-(1-piperidinyl)-3-pregnene-11,20-dione with hydrogen chloride is productive of 1-(11,20-diketopregnan-3-ylidene)-piperidinium chloride and treating 3-(4-morpholinyl)-3-pregnene-11,20-dione with hydrogen chloride is productive of 1-(11,20-diketopregnan-3-ylidene)-morpholinium chloride.

*Example 10.—1-(11,20-diketopregnan-3-ylidene)-pyrrolidinium bromide*

An excess of gaseous hydrogen bromide was bubbled into a chilled solution of two grams of 3-(1-pyrrolidinyl)-3-pregnene-11,20-dione in 25 milliliters of methylene chloride and the solvent was removed by evaporation under diminished pressure to give 1-(11,20-diketopregnane-3-ylidene)-pyrrolidinium bromide as a fluffy tan glass completely soluble in physiological saline.

*Example 11.—1-(11,20-diketopregnan-3-ylidene)-pyrrolidinium bromide*

Two grams of 3-(1-pyrrolidinyl)-3-pregnene-11,20-dione was dissolved in four milliliters of dioxane and 3.44 milliliters of a 1.63 molar solution of hydrogen bromide in dioxane was added. The reaction mixture was chilled and scratched or seeded to give a precipitate which was collected by filtration, washed with dioxane ether mixture, and dried to give 1.75 grams of 1-(11,20-diketopregnan-3-ylidene)-pyrrolidinium bromide as dense scales having a rotation [α]_D of plus 141 degrees in chloroform, infrared absorption maxima at 3440, 3380, 1696 and 1647 reciprocal centimeters, and the following analysis:

Analysis.—Calculated for $C_{25}H_{28}BrNO_2$: Br, 17.21. Found: Br, 17.50.

In the same manner as given in Example 10 treating 3-(1-piperidinyl)-3-pregnene-11,20-dione with hydrogen bromide is productive of 1-(11,20-diketopregnan-3-ylidene)-piperidinium bromide and treating 3-(4-morpholinyl)-3-pregnene-11,20-dione with hydrogen bromide is productive of 1-(11,20-diketopregnan-3-ylidene)-morpholinium bromide.

Example 12.—1-(11,20-diketopregnan-3-ylidene)-pyrrolidinium iodide

A solution of one gram of 3-(1-pyrrolidinyl)-3-pregnene-11,20-dione in ten milliliters of methanol containing 0.5 milliliter of concentrated hydrochloric acid and one milliliter of methyl iodide was heated under reflux overnight under an atmosphere of nitrogen, then the reaction mixture was concentrated by evaporation to a smaller volume whereupon off-white crystals separated. These were recrystallized from methanol to give 1-(11,20-diketopregnan-3-ylidene)-pyrrolidinium iodide having a melting point of 239 to 253 degrees centigrade with decomposition.

In the same manner as given above, treating 3-(1-piperidinyl)-3-pregnene-11,20-dione with methyl iodide and hydrochloric acid is productive of 1-(11,20-diketopregnan-3-ylidene)-piperidinium iodide and treating 3-(4-morpholinyl) - 3 - pregnene,11,20 - dione with methyl iodide and hydrochloric acid is productive of 1-(11,20-diketopregnan-3-ylidene)-morpholinium iodide.

Example 13.—1-(11,20-diketoallopregnan-3-ylidene)-pyrrolidinium chloride

In the same manner as given in Example 7, treating 3-(1-pyrrolidinyl)-2-allopregnene-11,20-dione with hydrogen chloride in anhydrous ether is productive of 1-(11,20-diketoallopregnan-3-ylidene)-pyrrolidinium chloride.

In the same manner as given in Example 9, treating 3-(1-piperidinyl)-2-allopregnene-11,20-dione or 3-(4-morpholinyl)-2-allopregnene-11,20-dione with hydrogen chloride is productive of the corresponding 1-(11,20-diketoallopregnan-3-ylidene)-piperidinium chloride or 1-(11,20-diketoallopregnan-3-ylidene)-morpholinium chloride.

Example 14.—1-(11,20-diketoallopregnan-3-ylidene)-pyrrolidinium bromide

In the same manner as given in Example 10, treating a methylene chloride solution of 3-(1-pyrrolidinyl)-2-allopregnene-3,20-dione with gaseous hydrogen bromide and evaporating the resulting solution is productive of 1-(11,20 - diketoallopregnan-3-ylidene)-pyrrolidinium bromide.

In the same manner as given in Example 10, treating 3-(1-piperidinyl)-2-allopregnene-11,20-dione or 3-(4-morpholinyl)-2-allopregnene-11,20-dione with hydrogen bromide is productive of the corresponding 1-(11,20-diketoallopregnan-3-ylidene)-piperidinium bromide or 1-(11,20-diketoallopregnan-3-ylidene)-morpholinium bromide.

Example 15.—1-(11,20-diketoallopregnan-3-ylidene)-pyrrolidinium iodide

In the same manner as given in Example 12, treating 3-(1-pyrrolidinyl)-2-allopregnene-11,20-dione with methyl iodide in the presence of hydrochloric acid is productive of 1-(11,20 - diketoallopregnan-3-ylidene)-pyrrolidinium iodide.

In the same manner as given in Example 12, treating 3-(1-piperidinyl-2-allopregnene-11,20-dione or 3-(4-morpholinyl)-2-allopregnene-11,20-dione with methyl iodide and hydrogen chloride is productive of the corresponding 1-(11,20-diketoallopregnan-3-ylidene)-piperidinium iodide or 1-(11,20-diketoallopregnan-3-ylidene)-morpholinium iodide.

It is to be understood that the invention is not to be limited to the exact details of operation or exact compunds shown and described as obvious modifications and equivalents will be apparent to one skilled in the art. The invention is therefore to be limited only by the scope of the appended claims.

I claim:
1. A compound of the formula:

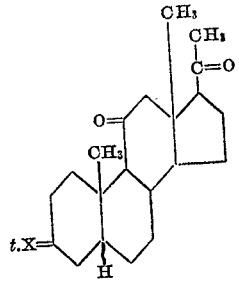

wherein X is a secondary amine radical selected from the group consisting of piperidinyl, pyrrolidinyl, and morpholinyl, and wherein $t$ is selected from the group consisting of chloride, bromide and iodide.

2. 1-(11,20 - diketopregnan-3-ylidene) - pyrrolidinium chloride.

3. 1-(11,20-diketopregnan-3-ylidene) - pyrrolidinium bromide.

4. 1-(11,20 - diketopregnan-3-ylidene) - pyrrolidinium iodide.

5. 1-(11,20-diketoallopregnan-3-ylidene)-pyrrolidinium chloride.

6. 1-(11,20-diketoallopregnan-3-ylidene)-pyrrolidinium bromide.

7. 1-(11,20-diketoallopregnan-3-ylidene)-pyrrolidinium iodide.

References Cited in the file of this patent
UNITED STATES PATENTS

| | | |
|---|---|---|
| 2,773,072 | Herr et al. | Dec. 4, 1956 |
| 2,781,342 | Herr et al. | Feb. 12, 1957 |
| 2,782,192 | Pederson et al. | Feb. 19, 1957 |